United States Patent [19]
Hwang

[11] Patent Number: 5,923,748
[45] Date of Patent: Jul. 13, 1999

[54] TELEPHONE DEVICE FOR PREVENTING A LONG-TERM ON-LINE STATE RESULTING FROM THE HANDSET BEING UNINTENTIONALLY OFF-HOOK

[75] Inventor: Bar-Chung Hwang, Taoyuan, Taiwan

[73] Assignee: Winbond Electronics Corp., Hsinchu, Taiwan

[21] Appl. No.: 08/854,161

[22] Filed: May 9, 1997

[30] Foreign Application Priority Data

Mar. 6, 1997 [TW] Taiwan ................................. 86203431

[51] Int. Cl.$^6$ ................................. H04M 1/00; H01H 9/00
[52] U.S. Cl. ............................ 379/377; 379/387; 379/33; 335/175; 335/179
[58] Field of Search ............................. 379/33, 382, 393, 379/377, 387; 361/45, 56; 335/179, 175; 200/46, 50.32

[56] References Cited

U.S. PATENT DOCUMENTS

| | | | |
|---|---|---|---|
| 4,063,299 | 12/1977 | Monroe | 361/45 |
| 4,849,846 | 7/1989 | Hung et al. | 361/56 |
| 4,922,529 | 5/1990 | Kiel | 379/387 |
| 5,606,593 | 2/1997 | Smith | 379/33 |
| 5,612,997 | 3/1997 | Vallelunga, Sr. et al. | 379/393 |

*Primary Examiner*—N. Le
*Assistant Examiner*—Shih-Wen Hsieh
*Attorney, Agent, or Firm*—Ladas & Parry

[57] ABSTRACT

A telephone device for preventing a long-term on-line state resulting from the handset being unintentionally left off-hook. The device preferably includes: a telephone line interface circuit serving as an interface between a ring line and a tip line, and an internal circuit; a ringing detector for sensing a ringing signal; a hybrid circuit dividing connecting ends of the telephone line interface circuit into an input end and output end; a dual-tone multi-frequency generator generating a dual-tone multi-frequency signal; a controller controlling the telephone line interface circuit to execute an automatic on-hook operation; a push-button pad outputting a control signal or numerical signal to the dual-tone multi-frequency generator in order to represent a pressed key by using a dual-tone multi-frequency signal; a switch controlled by the dual-tone multi-frequency generator, wherein a sound signal from a handset is interrupted as soon as the dual-tone multi-frequency generator outputs a dual-tone multi-frequency signal; a receiver off hook tone detector detecting a receiver off hook tone, wherein a signal is delivered to the controller when a receiver off hook tone is detected, and the controller thereby triggers the telephone line interface circuit into an automatic on-hook state; and a handset for receiving and transmitting the sound signal.

9 Claims, 4 Drawing Sheets

5,923,748

TELEPHONE DEVICE FOR PREVENTING A LONG-TERM ON-LINE STATE RESULTING FROM THE HANDSET BEING UNINTENTIONALLY OFF-HOOK

BACKGROUND OF THE INVENTION

1. Field of the Invention

The invention relates to a telephone device, and in particular to a telephone device for preventing a long-term on-line state resulting from the telephone's handset being unintentionally off-hook.

2. Description of the Prior Art

Referring to FIG. 1, the basic structure of a telephone according to the prior art is shown. The depicted telephone is of the type which generates Dual Tone Multi-Frequency (DTMF) sounds for the purpose of dialing telephone calls. The telephone according to the prior art comprises: a telephone line interface circuit 10 serving as an interface between a ring line and a tip line, and an internal circuit, wherein a switch hook controls the off-hook/on-hook states of the telephone; a ring detector 12 for sensing a ringing signal; a hybrid circuit 16 dividing connecting ends of the telephone line interface circuit into an input end and output end; a dual-tone multi-frequency generator 18 (i.e., a dialing IC) generating a dual-tone multi-frequency signal; a push-button pad 22 outputting a control signal or numeral signal to the dual-tone multi-frequency generator 18; a switch 24 controlled by the dual-tone multi-frequency generator 18, wherein a sound signal from a handset is interrupted as soon as the dual-tone multi-frequency generator 18 outputs a dual-tone multi-frequency signal; and a handset 26 including a receiver (for example, an earphone) and a transmitter (for example, a microphone) for receiving and transmitting the sound signal.

Generally, the off-hook/on-hook states of the above-mentioned telephone are determined by the position of the handset. As is well known, the telephone must be in an on-hook state if it is to receive incoming telephone calls. If it is off-hook, then the telephone can not be connected to from the outside, regardless of whether it is in use or not. Particularly, the handset is inadvertently placed in the off-hook position, a long-term off-hook state results. As a result, the user will not discover this situation until the user needs to use the telephone or an alarm signal from the telephone company switch is transmitted to the telephone to generate a sound signal of higher frequency and amplitude in order to inform the user of the unconnected off-hook state.

SUMMARY OF THE INVENTION

In view of the above, the present invention provides a telephone device for preventing a long-term on-line state resulting from the handset being unintentionally left off-hook.

In a preferred embodiment of the invention, an IC is employed to identify if a receiver off hook (ROH) tone from a telephone switch appears during an off-hook state. If a receiver off hook tone appears, the telephone informs the user. However, if the user disregards the receiver off hook tone, the telephone is automatically switched from the off-hook state to an on-hook state after a predetermined period of time, even though the handset remains off-hook. The telephone will still ring in response to receiving an incoming telephone call. At this point, the user can answer the incoming call by hanging up the handset and then picking it up once more.

Furthermore, the invention provides a button which can be depressed to override the above-mentioned function of the invention and maintain the off-hook state until the handset is hung up, if the user chooses not to be interrupted.

BRIEF DESCRIPTION OF THE DRAWINGS

The present invention will be more fully understood from the detailed description given hereinbelow and the accompanying drawings which are given by way of illustration only, and thus are not limitative of the present invention, and wherein.

DETAILED DESCRIPTION OF THE INVENTION

Figure 1:
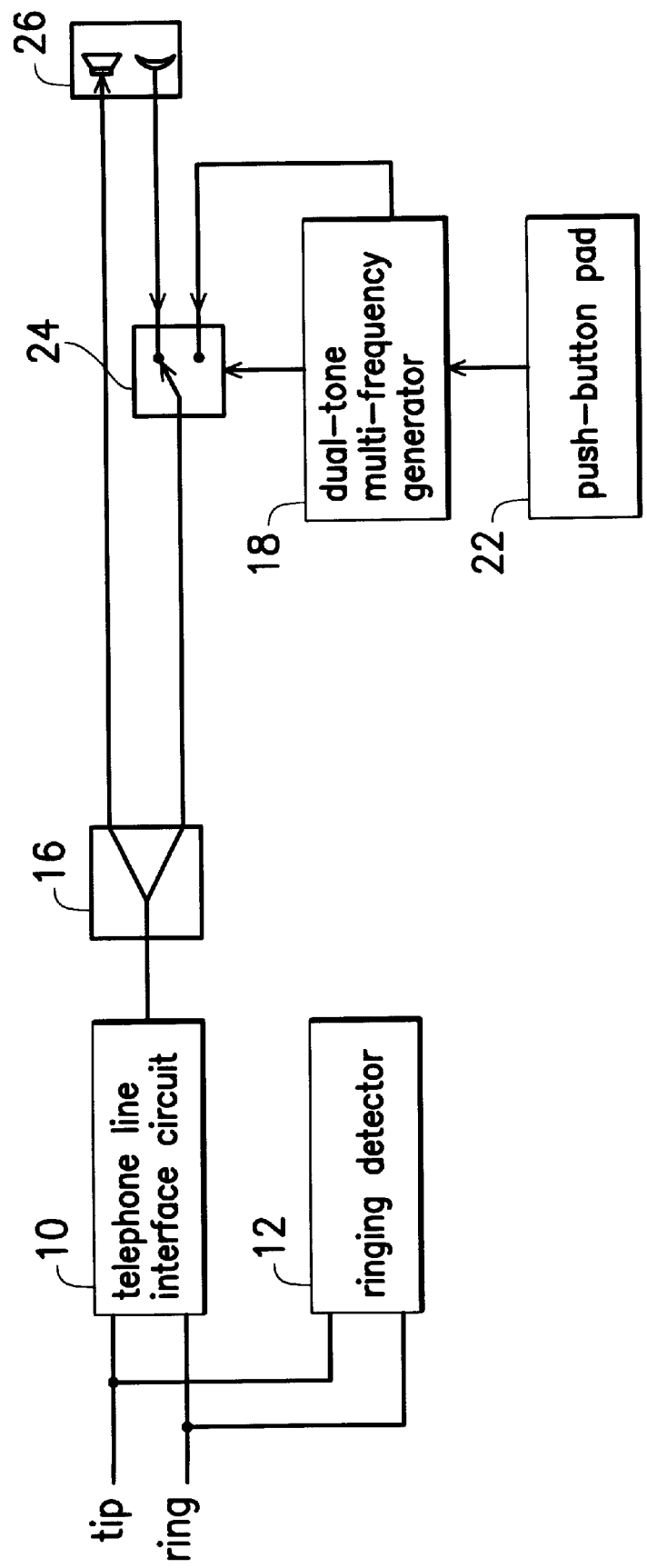
FIG. 1 is a block diagram illustrating the structure of a telephone device according to the prior art.
Figure 2:
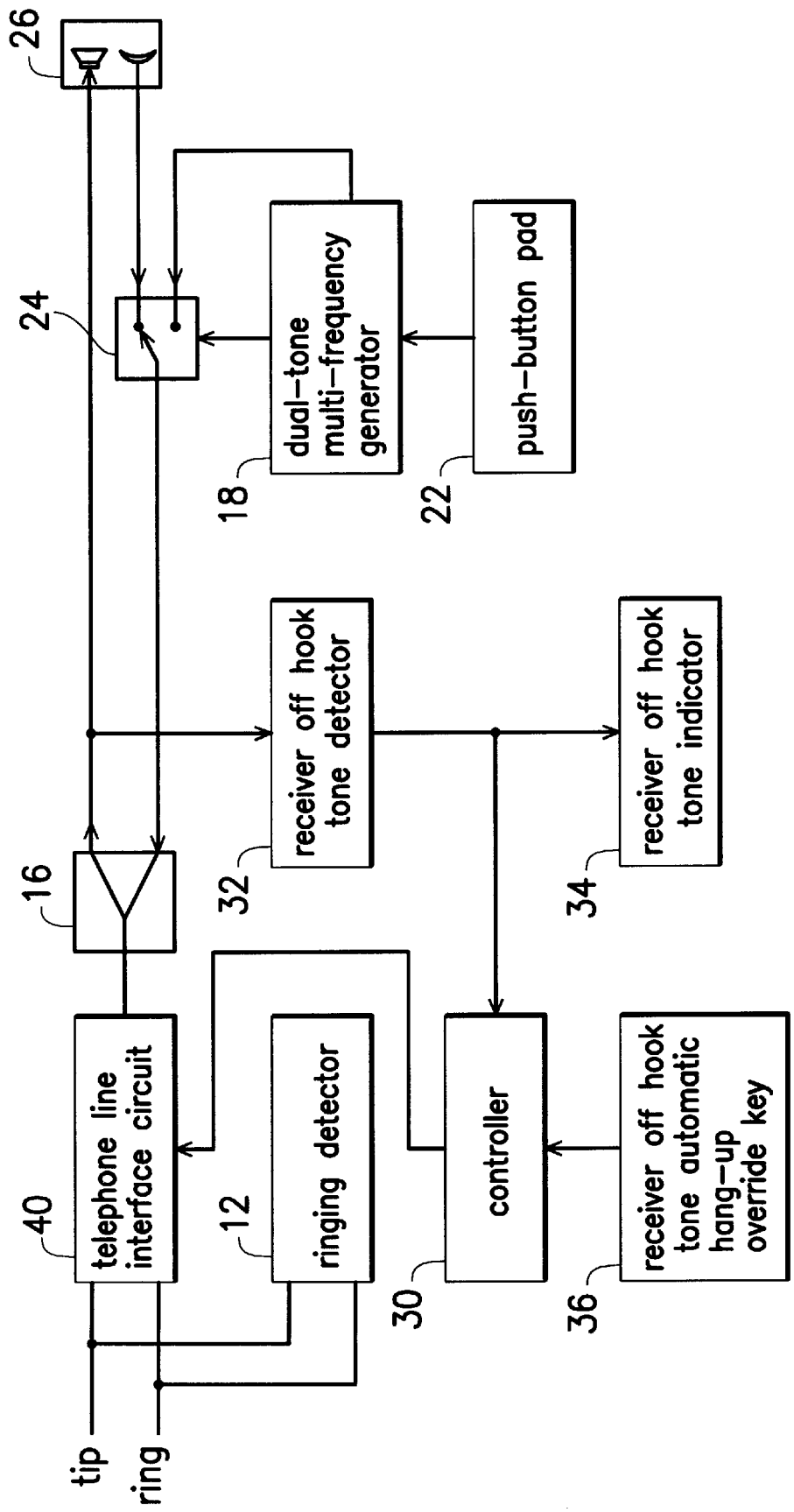
FIG. 2 a block diagram illustrating a telephone device for preventing a long-term on-line state resulting from the handset being unintentionally off-hook according to the invention.

Referring to FIG. 2, a telephone device for preventing a long-term on-line state resulting from the handset being unintentionally off-hook preferably comprises: a telephone line interface circuit 40 serving as an interface between a ring line and a tip line, and an internal circuit; a ring detector 12 for sensing a ringing signal; a hybrid circuit 16 dividing connecting ends of the telephone line interface circuit 40 into an input end and output end; a dual-tone multi-frequency generator 18 generating a dual-tone multi-frequency signal; a controller 30 controlling the telephone line interface circuit 40 to execute an automatic on-hook operation; a push-button pad 22 outputting a control signal or numeral signal to the dual-tone multi-frequency generator 18 in order to represent a depressed key by using a dual-tone multi-frequency signal; a switch 24 controlled by the dual-tone multi-frequency generator, wherein sound signals from a microphone pickup in handset 26 are interrupted as soon as the dual-tone multi-frequency generator 18 outputs a dual-tone multi-frequency signal; a receiver off hook tone detector 32 for detecting a receiver off hook tone, wherein a signal is delivered to the controller when a receiver off hook tone is detected, and thereby the controller 30 triggers the telephone line interface circuit 40 into an automatic on-hook state; a receiver off hook tone indicator 34 indicating that the telephone being in a receiver off hook tone state when the receiver off hook tone detector 32 senses a receiver off hook tone; a receiver off hook tone automatic hang-up override key 36 controlling the controller 30 to cancel its receiver off hook tone automatic on-hook function;. and a handset 26 including a receiver (for example, a earphone) and a transmitter (for example, the aforementioned microphone) for receiving and transmitting the sound signal.

Figure 3A:
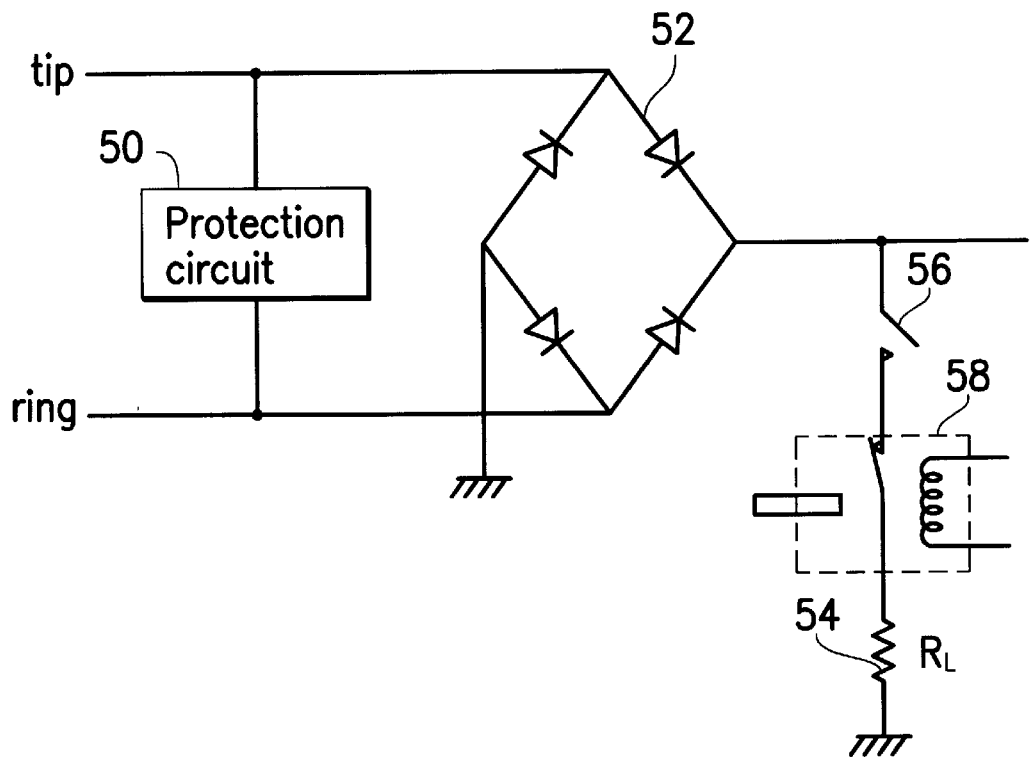
FIGS. 3a and 3b are circuit diagrams illustrating a telephone line interface circuit according to an embodiment of the invention.
Figure 3B:
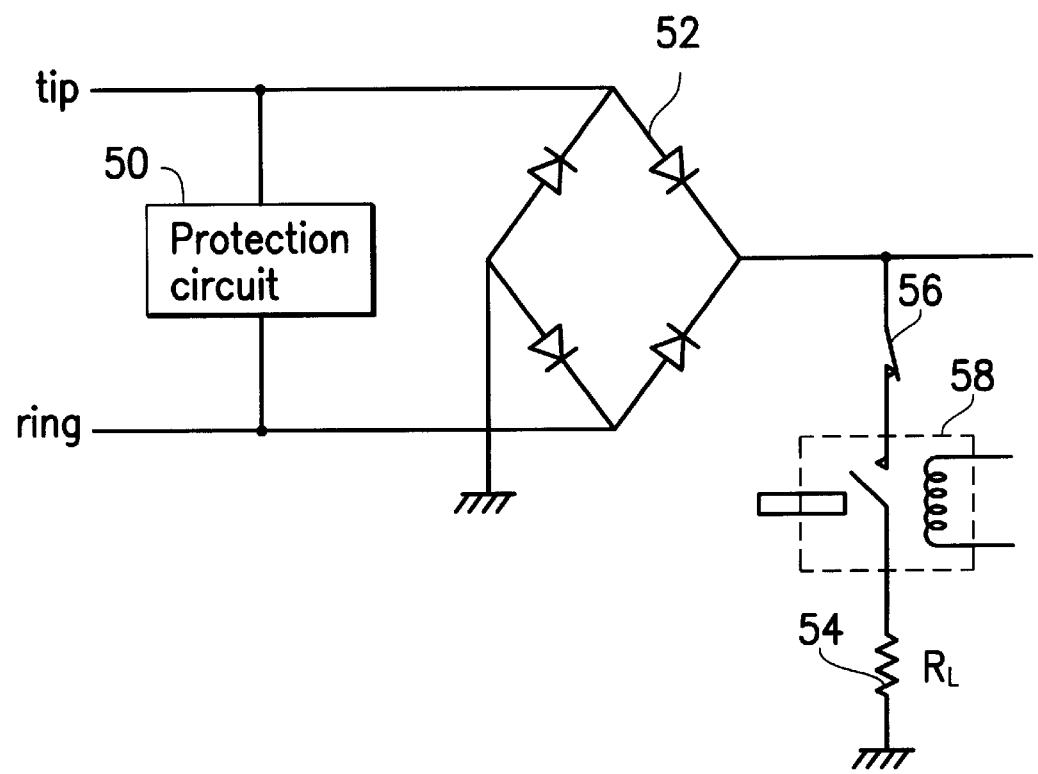

Referring to FIGS. 3a and 3b, the structure of a telephone line interface circuit according to a prefered embodiment of the invention preferably comprises: a protective circuit 50 which prevents the internal circuit from damage resulting from excessive external voltages; a bridge rectifier 52 for generating a DC voltage for use in the circuit; an off-hook resistor 54 providing an off-hook load during an on-line period; a hook switch 56 controlling the off-hook/on-hook states of the telephone; a forced on-hook latching relay 58 which forces the telephone into an on-hook state and which can be enabled by means of an on-hook action.

Figure 4A:
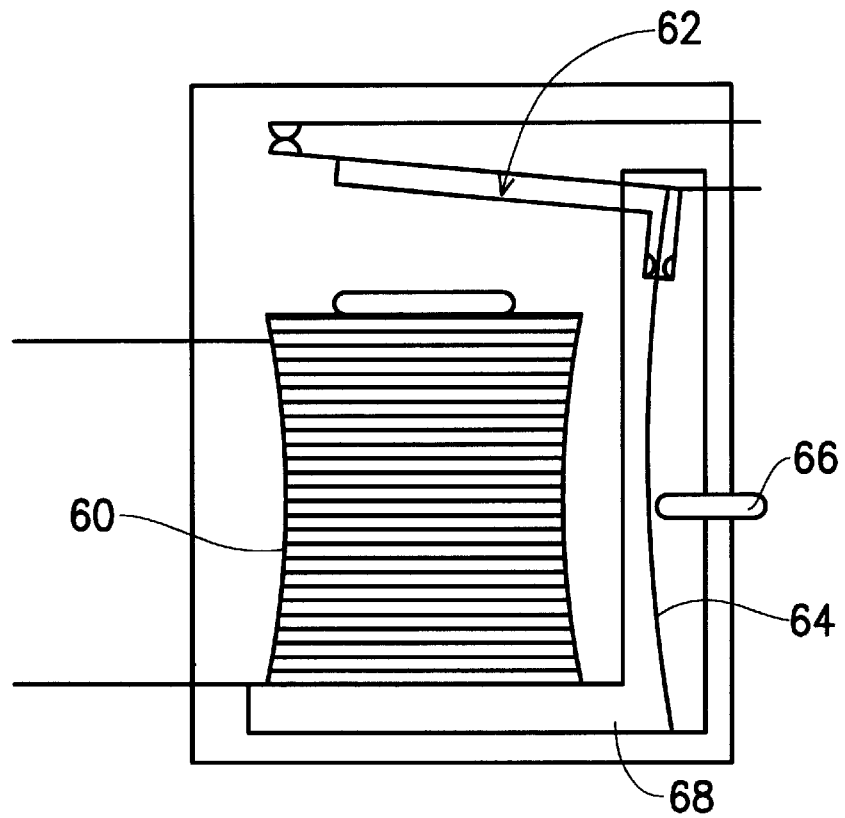
FIGS. 4a and 4b are schematic views illustrating the structure of a latching relay according to the invention.
Figure 4B:
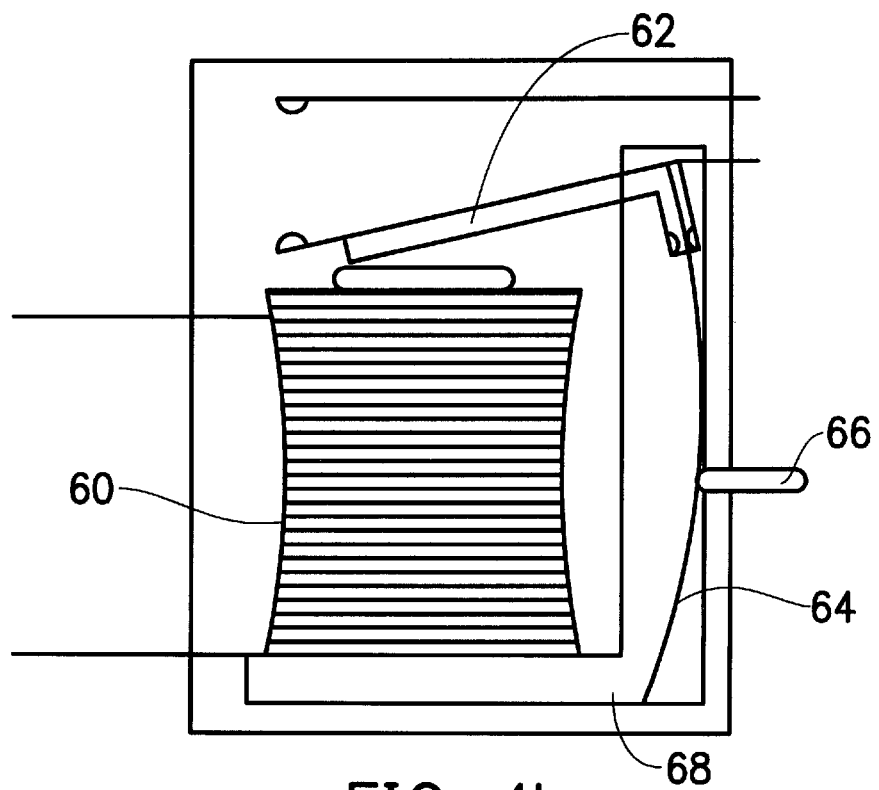

Referring to FIGS. 4a and 4b, the structure of a forced on-hook latching relay preferably comprises: a coil 60 for generating a magnetic force; a switch 62 which is dragged by the magnetic force generated by the coil 60 to remove a common point for switching the connection state of said switch 62; an latching fragment 64 which receives an external force and is moved following the movement of the switch to switch to one of two different stable states, wherein the switch 62 can maintain the stable state without an external force; a reset button 66 for providing an external force to switch the latching fragment 64 to one of its two different stable states by manual or mechanical pressure; and a fixed support 68 for fixing said coil 60, switch 62 and latching fragment 64 and providing a magnetic loop to generate a stronger magnetic force.

Moreover, the receiver off hook tone indicator 34 shown in FIG. 2 is selectively utilized. That is, the circuit of the invention can operate normally without the receiver off hook tone indicator 34. The dual-tone multi-frequency generator 18 can be an IC model W91080 manufactured by Winbond Electronics Corp. of Taiwan, R.O.C. and the receiver off hook tone detector 32 can be an IC model W62401 also manufactured by Winbond Electronics Corp.

In a normal condition of the telephone, the forced on-hook latching relay is in a state as shown in FIGS. 3a and 4a, wherein a load resistor 54, a hook 56 and the switch of latching relay 58 are connected in series. At this point, whether the telephone is in an on-line state is determined by the hook switch 56. However, once the handset is taken off-hook, no matter whether the telephone is in use or not, a telephone switch to which the telephone is connected transmits a receiver off hook tone to the telephone. As shown in FIG. 2, the receiver off hook tone detector 32 senses the receiver off hook tone and then outputs a signal to the controller 30 and receiver off hook tone indicator 34. Therefore, the receiver off hook tone indicator 34 indicates that the telephone is in a receiver off hook tone state. After a predetermined period of time, the controller 30 sends an on-hook signal to the forced on-hook latching relay 58 of the telephone line interface circuit 40. Then, the switch 62 of the forced on-hook latching relay 58 is immediately switched into an on-hook state as shown in FIGS. 3b and 4b. Since the relay latches to the position shown in FIGS. 3b and 4b, power no longer needs to be supplied to the internal circuits of the telephone, so that preferably no current needs to flow through the coil 60 of the forced on-hook latching relay 58 at this time. In addition, since the latching fragment 64 assumes a stable position (see FIG. 4b) at this time, the on-hook state of the telephone can be maintained essentially forever. It should be noted that the power source for the coil must supply sufficient current to ensure that the latching fragment 64 of the forced on-hook latching relay is driven to the state shown in FIG. 4b, when the controller 30 emits the on-hook signal.

In addition, when the handset is hung up, the hook switch 56 closes and it also presses the reset button 66 of the latching relay 58 so that the switch contacts 62 of the latching relay 58 are simultaneously closed, as shown in FIG. 4a, so that the telephone returns to its normal state in which whether the telephone is on-hook or off-hook is determined by the on-hook/off-hook state of the handset.

However, if the user does not want to be interrupted, the user may pick up the handset and press the receiver off hook tone automatic hang-up override key 36 before a receiver off hook tone automatic on-hook operation, thereby causing the controller to stop detecting the receiver off hook tone and transmitting the on-hook signal, so that the switch of the forced on-hook latching relay 58 will not be turned off by an attractive magnetic force generated by the coil. That is the telephone still maintains the off-hook state until the handset is hung up again.

What is claimed is:

1. A telephone device preventing a long-term on-line state resulting from a handset being unintentionally off-hook, comprising:

a telephone line interface circuit serving as an interface between a ring line and a tip line, comprising a hook switch controlling off-hook/on-hook states of the telephone and a forced on-hook latching relay which includes:

a coil for generating a magnetic force, a switch which is drawn by said magnetic force generated by said coil to switch the connection state of said switch, a latching fragment which receives an external force and is moved following the movement of said switch to switch to one of two different stable states, wherein the switch can maintain said stable state even without an existing external force, a reset button for providing an external force to said latching fragment to switch one of two different stable states, and a fixed support for fixing said coil;

a hybrid circuit for dividing connecting ends of said telephone line interface circuit into an input end and an output end;

a controller controlling said telephone line interface circuit to execute an automatic on-hook operation;

a receiver off hook tone detector for detecting a receiver off-hook tone, wherein a signal is delivered to said controller when a receiver off-hook tone is detected, and thereby said controller triggers said telephone line interface circuit to assume its on-hook state; and a handset for receiving and transmitting a sound signal.

2. The telephone device as claimed in claim 1, further comprising a receiver off hook tone indicator indicating that the telephone is a receiver off hook tone state when said receiver off hook tone detector senses a receiver off hook tone.

3. The telephone device as claimed in claim 1, further comprising a receiver off hook tone automatic hang-up override key which is pressed after picking up said handset and before executing said automatic on-hook operation to cancel the busy automatic on-hook function until said handset is hung up.

4. The telephone device as claimed in claim 1, wherein said reset button is depressed simultaneously, when said hook switch is switched from said off-hook state to said on-hook state.

5. A telephone device for preventing a long-term on-line state resulting from a handset being unintentionally off-hook, comprising:

a telephone line interface circuit serving as an interface between a ring line and a tip line, and an internal circuit, comprising:

(i) a hook switch controlling the off-hook/on-hook states of the telephone; and (ii) a forced on-hook latching relay which includes:

a coil for generating a magnetic force, a switch which is drawn by said magnetic force generated by said coil to switch the connection state of said switch, a latching fragment which receives an external force and is moved following the movement of said switch to switch to one of two different stable states, wherein the switch can maintain said stable state even without an existing external force, a reset button for providing an external force to said latching fragment to switch one of two different stable states and a fixed support for fixing said coil; and (iii) a receiver off-hook tone detector for detecting a receiver off-hook tone, wherein said receiver off-hook tone detector triggers said telephone line interface circuit to execute an automatic on-hook operation once the receiver off-hook tone is detected for a predetermined period of time.

6. The telephone device as claimed in claim 5, wherein said telephone line interface circuit further comprises:

a protection circuit protecting an internal circuit from damage resulting from an excessive external voltage;

a bridge rectifier transferring an external two-pole signal into a single-pole signal to facilitate an internal circuit process; and an off-hook resistor providing an off-hook load during an on-line period.

7. The telephone device as claimed in claim 5, further comprising:

a ringing detector checking a ringing signal;

a hybrid circuit dividing connecting ends of said telephone line interface circuit into an input end and output end;

a dual-tone multi-frequency generator generating a dual-tone multi-frequency signal;

a controller controlling said telephone line interface circuit to execute an automatic on-hook operation;

a push-button pad outputting a control signal or numerical signal to said dual-tone multi-frequency generator in order to represent a depressed key by using a dual-tone multi-frequency signal;

a switch controlled by said dual-tone multi-frequency generator, wherein a sound signal from a handset is interrupted as soon as said dual-tone multi-frequency generator outputs a dual-tone multi-frequency signal; and a receiver off hook tone indicator indicating that the telephone is a receiver off hook tone state when said receiver off hook tone detector senses a receiver off hook tone.

8. The telephone device as claimed in claim 5, further comprising a receiver off hook tone automatic hang-up override key which is pressed after picking up said handset and before executing said automatic on-hook operation to cancel the busy automatic on-hook function until said handset is hung up.

9. The telephone device as claimed in claim 6, wherein said reset button is depressed simultaneously, when said hook switch is switched from said off-hook state to said on-hook state.

* * * * *